(No Model.)

H. & W. SIEBERT.
CLIP FOR SILVER WARE CASES.

No. 425,190. Patented Apr. 8, 1890.

WITNESSES:

INVENTOR:
H. Siebert
BY W. Siebert
Munn &

ATTORNEYS

UNITED STATES PATENT OFFICE.

HENRY SIEBERT, OF BAYONNE, NEW JERSEY, AND WILLIAM SIEBERT, OF NEW YORK, N. Y.

CLIP FOR SILVER-WARE CASES.

SPECIFICATION forming part of Letters Patent No. 425,190, dated April 8, 1890.

Application filed November 26, 1889. Serial No. 331,686. (No model.)

*To all whom it may concern:*

Be it known that we, HENRY SIEBERT, of Bayonne, in the county of Hudson and State of New Jersey, and WILLIAM SIEBERT, of the city, county, and State of New York, have invented a new and Improved Clip for Silver-Ware Cases, of which the following is a full, clear, and exact description.

The invention relates to clips for silver-ware cases such as shown and described in the United States Letters Patent No. 408,935, granted to us August 13, 1889.

The object of the present invention is to provide a new and improved clip which is very simple and durable in construction, and in which the spring-strips are chiefly secured to the blocks.

The invention consists in certain parts and details and combinations of the same, as will be described hereinafter, and then pointed out in the claims.

Reference is to be had to the accompanying drawings, forming a part of this specification, in which similar letters of reference indicate corresponding parts in all the figures.

Figure 1:
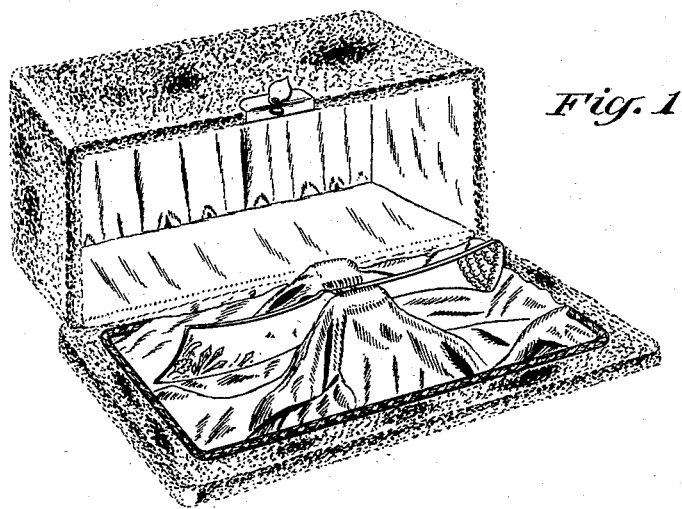
Figure 3:
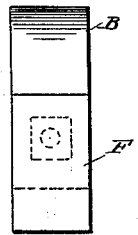
Figure 2:
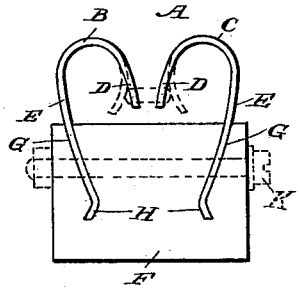

Figure 1 is a perspective view of the improvement as applied. Fig. 2 is a side elevation of the improvement, and Fig. 3 is an end view of the same.

The improved clip A is provided with two spring-arms B and C, made of an inverted-U shape and arranged opposite each other, as is plainly shown in Fig. 2. Each spring-arm B is provided with a short leg D, which is arranged opposite the short leg of the other arm, and each is provided with a long leg E, secured to the block F, adapted to be fastened into a casing and covered with suitable material in the usual manner, and as shown in Fig. 1. The lower ends of the short legs D terminate near the top of the block F, while the long legs E are fitted into transversely-extending slots G, formed in the block F, as is plainly shown in Fig. 2. The lower ends of the legs E are preferably provided with a bend at H, fitting into a corresponding V-shaped continuation of the slot G, and serving to prevent the arms B and C from being drawn upward when the article held between the short legs D, is removed from the same.

A bolt K may be used for securing the long legs E of the clip (shown in Fig. 2) to the block F; but the said bolt can be dispensed with, if desired, as the projections H securely hold the long legs in place on the block.

When the article to be supported on the clip A is pressed between the oppositely-arranged short legs D of the arms B and C, then the said short legs bend outward, as shown in dotted lines in Fig. 2, thereby securely holding the article in place.

Having thus described our invention, what we claim as new, and desire to secure by Letters Patent, is—

1. A clip for silver-ware cases, comprising a slotted block and inverted-U-shaped spring-arms, each provided with short legs arranged opposite each other and long legs fitted into the slots of the said block, substantially as shown and described.

2. A clip for silver-ware cases, comprising a slotted block and inverted-U-shaped spring-arms, each provided with short legs arranged opposite each other and long legs fitted into the slots of the said block, and a bolt passing through the said block and the long legs of the spring-arms, substantially as shown and described.

HENRY SIEBERT.
WM. SIEBERT.

Witnesses:
NAIR A. CUMING,
EUGENE CHEVALLIER.